United States Patent
Ronca et al.

(10) Patent No.: US 6,546,366 B1
(45) Date of Patent: Apr. 8, 2003

(54) TEXT-TO-SPEECH CONVERTER

(75) Inventors: David Randall Ronca, San Jose, CA (US); Stephen Francis Ruhl, Campbell, CA (US)

(73) Assignee: Mitel, Inc., Herndon, VA (US)

( * ) Notice: Subject to any disclaimer, the term of this patent is extended or adjusted under 35 U.S.C. 154(b) by 0 days.

(21) Appl. No.: 09/258,507

(22) Filed: Feb. 26, 1999

(51) Int. Cl.$^7$ ............................................... G10L 13/04
(52) U.S. Cl. ...................................... 704/260; 704/258
(58) Field of Search ................................ 704/258, 262, 704/263, 264, 265, 266, 267, 269, 270

(56) References Cited

U.S. PATENT DOCUMENTS

| | | | |
|---|---|---|---|
| 4,685,135 A | * 8/1987 | Lin et al. ..................... | 704/260 |
| 4,692,941 A | * 9/1987 | Jacks et al. .................. | 704/260 |
| 4,811,400 A | * 3/1989 | Fisher ......................... | 704/260 |
| 4,841,550 A | 6/1989 | George et al. | |
| 4,852,168 A | * 7/1989 | Sprague ...................... | 704/211 |
| 5,349,636 A | 9/1994 | Irribarren | |
| 5,367,534 A | 11/1994 | Chou et al. | |
| 5,530,740 A | 6/1996 | Irribarren et al. | |
| 5,642,466 A | * 6/1997 | Narayan ...................... | 704/260 |
| 5,732,286 A | 3/1998 | Leger | |
| 5,737,395 A | 4/1998 | Irribarren | |
| 5,841,966 A | 11/1998 | Irribarren | |

FOREIGN PATENT DOCUMENTS

| | | |
|---|---|---|
| EP | 0 515 101 A2 | 11/1992 |
| EP | 0 688 018 A1 | 12/1995 |
| EP | 0 779 575 A1 | 6/1997 |
| GB | 2 242 097 A | 9/1991 |
| GB | 2 274 041 A | 7/1994 |
| GB | 2 307 151 A | 5/1997 |
| GB | 2 331 678 A | 5/1999 |
| WO | WO 97/17777 | 5/1997 |

* cited by examiner

*Primary Examiner*—Scott L. Weaver
(74) *Attorney, Agent, or Firm*—Beyer Weaver & Thomas, LLP

(57) ABSTRACT

A text-to-speech converter includes a text-to-speech engine receiving source text and converting the source text into speech data. A read mechanism reads speech data from the text-to-speech engine and writes the speech data to a buffer. A throttle mechanism reads speech data from the buffer and conveys the speech data to a playback operation. The throttle mechanism triggers the read mechanism to read data from the text-to-speech engine and writes the speech data to the buffer so that unread speech data in the buffer remains ahead of speech data read by the throttle mechanism by at least a predetermined amount.

24 Claims, 9 Drawing Sheets

TEXT-TO-SPEECH CONVERTER

CROSS-REFERENCE TO RELATED APPLICATIONS

This application is related to: (i) U.S. patent application Ser. No. 09/258,717, filed on same day herewith, entitled "AUTOMATIC USER PREFERENCE SELECTION FOR MESSAGE PLAYBACK BASED ON CALLER LINE IDENTIFICATION DATA"; (ii) U.S. patent application Ser. No. 09/259,811 filed on same day herewith, entitled "AUTOMATIC SYNCHRONIZATION OF ADDRESS DIRECTORIES FOR UNIFIED MESSAGING"; and (iii) U.S. patent application Ser. No. 09/259,463, filed on same day herewith, entitled "DIAL BY NAME FEATURE FOR MESSAGING SYSTEM"; all of which are all incorporated herein by reference for all purposes.

FIELD OF THE INVENTION

The present invention relates generally to messaging systems and in particular to a text-to-speech converter and to a messaging system incorporating the same. The present invention also relates to a system to buffer data transmitted from a source to a destination over a network.

BACKGROUND OF THE INVENTION

Voice messaging systems are common in today's business community. Most business organizations or enterprises make use of a private branch exchange (PBX) to direct a caller's telephone call to the appropriate extension of the called party. If the called party is unable to answer the telephone call, the telephone call is forwarded to a voice messaging system, which allows the caller to leave a voice message in the mailbox assigned to the called party. Messages left for called parties within the business organization can be retrieved from memory by calling the voice messaging system using a telephone and entering appropriate commands via a touch-tone keypad. Retrieved messages can be played, forwarded or deleted. An example of a voice messaging system of this nature is the Series 6 sold by Mitel Corporation of Ottawa, Ontario, Canada.

In addition to voice messages, communications within business organizations are also stored in facsimile and text formats. In the past, separate messaging systems have been used to handle these different types of communications. Unfortunately, prior art messaging systems designed to handle one type of communication have not provided any means to interact with messaging systems handling other types of communications. This has required users to access each messaging system individually to retrieve messages and has required business organizations to maintain and manage multiple messaging systems separately. As a result, it has been necessary to establish separate accounts, address lists and message mailboxes in each messaging system for the various users in the business organizations.

More recently, attempts have been made to interconnect different messaging systems to provide access to different types of messages from a single point. For example, U.S. Pat. No. 5,349,636 to Irribarren discloses a system and method for voice mail systems and interactive voice response (IVR) systems. The Irribarren system includes a voice message system and a text message system integrated via a network, which coordinates the functions of each individual message system. A user may access messages stored in the voice message system and in the text message system via a single telephone call. Although this system allows access to different types of messages, the voice message and text message systems require separate management.

The current trend is to integrate these various messaging systems to allow users to access all types of communications once a connection is made to the messaging system. To that end, unified messaging systems have been developed to provide users access to virtually all of their communications. Messaging systems of this nature store all messages for entities within the enterprise at a common location. The entities may be individuals, groups, departments, or any appropriate logical organizations. Users accessing the messaging system via a telephone, desktop computer or other communication device, have access to all of their messages regardless of message type and regardless of the type of communication device used to access the messaging system. Appropriate message translators such as text-to-speech (TTS) converters, speech-to-text (SST) converters etc. are included to enable users to retrieve messages stored in formats not supported by the communication devices used to access the messaging system.

Two types of text-to-speech converters have been commonly used in messaging systems to-date. The most common and affordable type of text-to-speech converter is central processing unit (CPU) based, and makes use of a system processor to perform the text-to-speech conversion. Digital signal processing (DSP) based text-to-speech converters are also used. Although DSP based text-to-speech converters are faster, they are significantly more expensive than their CPU based counterparts.

While CPU based text-to-speech converters are easier and more economical to implement; they suffer from a number of inherent limitations. For example, in CPU based text-to-speech converters, the text-to-speech conversion process is very CPU intensive. A large text message may consume a significant number of CPU cycles leaving very little CPU for other critical tasks. Also, the output of CPU based text-to-speech converters is stored in a file or memory. A typical electronic mail (e-mail) message converted into speech can easily consume 1 Mb of memory or more. In addition, latency in the text-to-speech conversion grows in proportion to the amount of text being converted. Thus, large text messages introduce noticeable latencies when converted and played by voice messaging systems. Furthermore, often text messages do not convert well resulting in intelligible voice messages. When this occurs, users typically skip the messages. Unfortunately, in this case significant CPU resources are wasted to convert the entire text message before the user begins to listen to the message.

Voice messaging systems incorporating CPU based text-to-speech converters, typically perform the text-to-speech conversion in the background thereby reducing the delay before the text messages are read. However, lack of throttling places heavy loading on the CPU. Also, if enhancements are added to the text-to-speech converters of this nature, CPU usage increases even further. Thus, the text-to-speech converters are only able to perform a small number of simultaneous operations. Accordingly, improvements to CPU based text-to-speech converters are desired.

Thus, there is a need for an improved text-to-speech converter and messaging system incorporating the same. There is also a need for a novel system to buffer data transmitted from a source to a destination over limited bandwidth networks.

SUMMARY OF THE INVENTION

According to one aspect of the present invention there is provided in a text-to-speech converter that includes: a textto-speech engine receiving source text and converting the source text into speech data; a read mechanism reading speech data from the text-to-speech engine and writing the speech data to a buffer; and a throttle mechanism reading speech data from the buffer and conveying the speech data to a playback operation, the throttle mechanism triggering the read mechanism to read data from the text-to-speech engine and write the speech data to the buffer so that unread speech data in the buffer remains ahead of speech data read by the throttle mechanism by at least a predetermined amount.

In the preferred embodiment, it is preferred that the predetermined amount is programmable. Preferably, the read mechanism pre-fills the buffer during initialization to include a predetermined amount of unread speech data before the throttle mechanism is permitted to read speech data from the buffer. It is also preferred that the buffer is unavailable to the throttle mechanism during writing of speech data to the buffer. Furthermore, it is preferred that after the throttle mechanism reads speech data from the buffer, the throttle mechanism examines the buffer to determine if unread speech data remaining in the buffer is at least equal to the predetermined amount. The throttle mechanism triggers the read mechanism if unread speech data in the buffer is less than the predetermined amount. It is also preferred that during reading of data from the buffer by the throttle mechanism, the buffer is unavailable to the read mechanism for writing.

In one embodiment, the read mechanism is a background thread invoked by a central processing unit. The background thread is responsive to read events generated by the throttle mechanism when unread speech data in the buffer falls below the predetermined amount.

According to another aspect of the present invention there is provided a text-to-speech converter that includes: a text-to-speech engine receiving source text and converting the source text into speech data; a read mechanism reading speech data from the text-to-speech engine and writing the speech data to a buffer; and a throttle mechanism reading speech data from the buffer and conveying the speech data to a playback operation, the throttle mechanism triggering the read mechanism to read data from the text-to-speech engine and write the speech data to the buffer so that at least a predetermined amount of unread speech data remains in the buffer.

According to still yet another aspect of the present invention there is provided a system to buffer data transmitted from a source to a destination over a network interconnecting the source and destination, the system includes: a read mechanism reading video and/or audio data from the source and writing the data to a buffer; and a throttle mechanism reading data from the buffer and conveying the data to the destination via the network, the throttle mechanism triggering the read mechanism to read data from the source and write the data to the buffer so that at least a predetermined amount of unread data remains in the buffer.

According to still yet another aspect of the present invention there is provided a method of converting a text message to a speech message that includes the operations of: receiving a text message and converting the text message into speech data; reading quantities of the speech data and writing the quantities of speech data to a buffer; and reading speech data from the buffer and conveying the speech data to a playback operation for voice playback of the text message, the speech data being written into the buffer so that at least a predetermined amount of unread speech data remains in the buffer while the speech data is being read from the buffer.

The present invention provides advantages in that since intelligent buffering is used to manage the text-to-speech conversion, CPU usage is reduced and memory usage is more efficient as compared to conventional CPU based text-to-speech converters. Since CPU usage is reduced, a large number of simultaneous text-to-speech conversion operations can be performed without requiring additional resources.

The present invention also provides advantages in that since converted text is played back at a slow rate, the converted text being placed in the buffer, need only stay ahead of the converted text being read from the buffer for voice playback, by a nominal amount to avoid gaps in playback. As a result, the amount of up-front processing that is required before message playback commences is reduced. Furthermore, the slow rate of message playback allows for greater flexibility in terms of background processing. Features such as e-mail scrubbing to make text messages more readable can be added without causing any significant overhead or latency issues.

BRIEF DESCRIPTION OF THE DRAWINGS

Embodiments of the present invention will now be described more fully with reference to the accompanying drawings in which.

DETAILED DESCRIPTION OF THE INVENTION

One aspect of the present invention relates to text-to-speech (TTS) converters for converting text messages into speech to allow a user to retrieve and play text messages through a voice messaging system. This aspect of the present invention can be implemented in virtually any type of messaging system accessible via a telephone or telephone device such as voice and text messaging systems, interactive voice response (IVR) systems and unified messaging systems. Embodiments of the present invention implemented in a unified messaging system will now be described.

Figure 2:
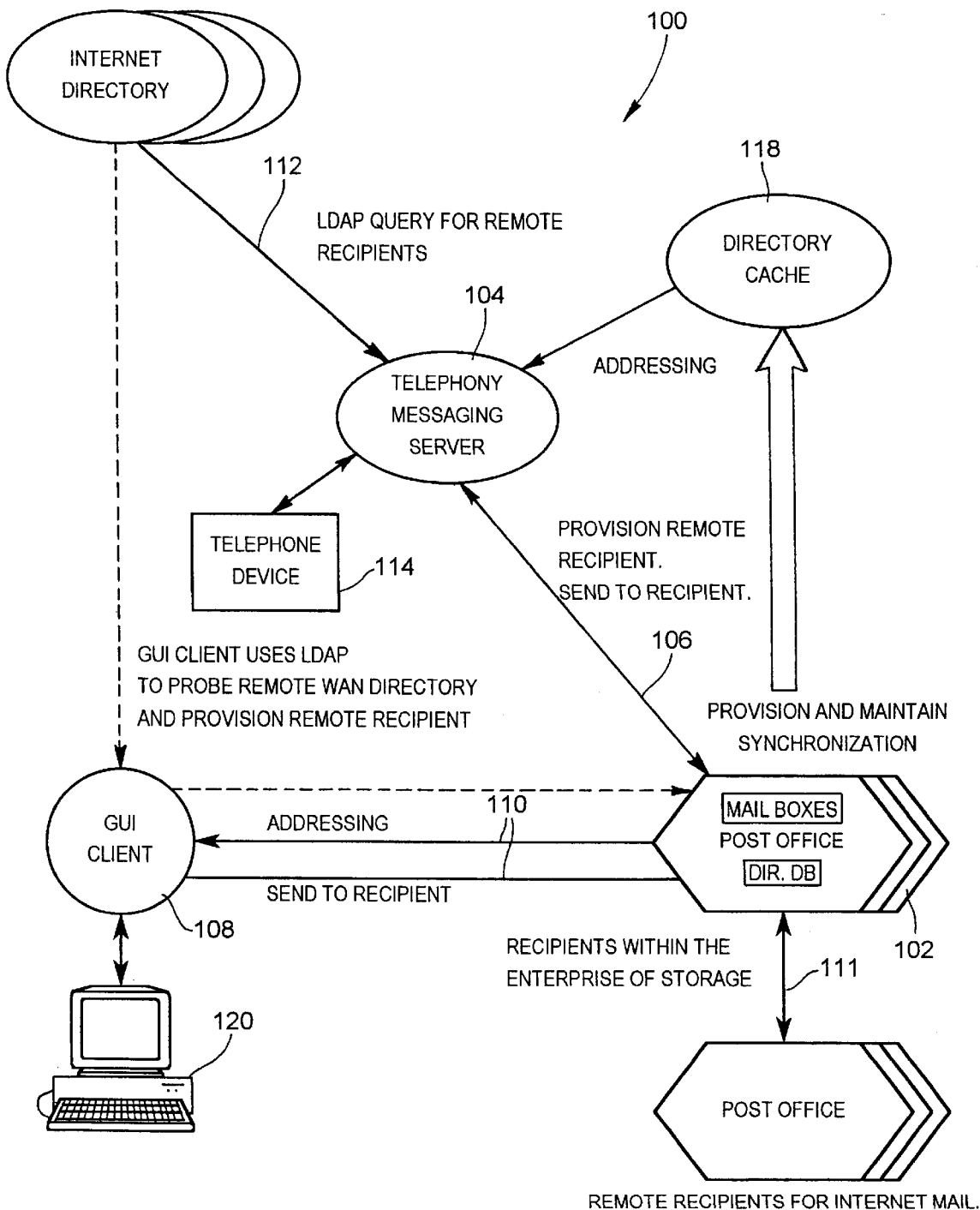
FIG. 2 is a diagrammatic overview of a unified messaging system in accordance with the present invention.

Turning now to FIG. 2, a messaging system is shown and is generally indicated to by reference numeral 100. Messaging system 100 includes a post office 102 communicating with a telephony messaging server 104. The post office 102 runs on one or more servers behaving logically as a single entity and is connected to the telephony server 104 via a local area network 106. Post office 102 communicates with clients 108, only one of which is shown for illustrative purposes, via a local area network, modem or other communication channel 110. Post office 102 and telephony messaging server 104 also communicate with external messaging systems via wide area networks 111 and 112 respectively.

The post office 102 provides message storage and delivery facilities for users of the messaging system 100 and includes mailboxes in which messages for the users are stored. The post office 102 handles and stores user messages regardless of format. Thus, the post office 102 stores voice messages received from the telephony messaging server 104 as well as text messages, facsimile messages, graphics messages etc. received from client 108 and/or wide area network 111. The post office 102 also maintains a directory database of user information including addresses, locations and addressing related information as well as user preference records as will be described. The directory database information is accessible, retrievable and updatable using database type queries. In the preferred embodiment, post office 102 runs commercially available post office software such as Microsoft Exchange® sold by Microsoft Corporation of Redmond Wash.

In the preferred embodiment, telephony messaging server 104 is a model TS800 telephony server provided by Mitel Corporation of Ottawa, Ontario or similar PC-based model. The telephony messaging server 104 executes a voice messaging application to handle incoming telephone calls, which cannot be completed. As is well known to those of skill in the art, the voice messaging application includes a speech file administrator which retrieves prerecorded voice message prompts from a database to direct a caller to leave a message for a particular called party. Messages recorded by the voice messaging application are conveyed to the post office 102 for storage in the appropriate mailboxes. The voice messaging application also handles incoming user calls to allow users to retrieve messages stored in their mailboxes.

Telephony users may access the voice messaging application using a typical telephone or telephony device 114 providing telephone functions that is either directly connected to telephony messaging server 104 or connected to the telephony messaging server 104 through a private branch exchange (PBX) and a publicly switched telephone network PSTN (not shown). During access, users enter touchtone commands and passwords to retrieve messages from their mailboxes in the post office 102. The voice messaging application calls the speech file administrator, which provides the appropriate voice message prompts to navigate users through the voice messaging application. During message playback, if a message stored in a user's mailbox is in a format not supported by the telephone or telephony device 114 used to access the messaging system 100, such as for example a text message, the voice messaging application calls an appropriate message translator, such as a text-to-speech (TTS) converter, to convert the message into a form which can be played back to the user. In the present embodiment, the voice messaging application calls a CPU based TTS 200 using intelligent buffering (see FIG. 3) to reduce CPU usage and manage memory usage more efficiently. Further details of the TTS and its operation are described below.

The telephony messaging server 104 communicates with a directory cache 118 that is updated by the post office 102. The directory cache 118 stores a subset of the information stored by the post office 102. Specifically, the directory cache stores addressing information for users and groups associated with the messaging system. The telephony messaging server 104 accesses the directory cache 118 in response to user and caller queries made via a telephone device 114 to reduce directory search times and provide a fast addressing service. Further specifics of the directory cache are described in U.S. application Ser. No. 09/259,811, filed on same day herewith, for an invention entitled "AUTOMATIC SYNCHRONIZATION OF ADDRESS DIRECTORIES FOR UNIFIED MESSAGING", the contents of which are incorporated herein by reference.

Client 108 in this embodiment is associated with or in the form of a computing device such as a personal computer 120. Through personal computer 120, a user can access voice messages, facsimile messages, electronic mail messages etc. stored in their post office mailbox. The user can also use personal computer 120 to perform messaging functions such as create, attach, read, modify, reply, forward, store and delete messages of various types. In the preferred embodiment, the personal computer 120 runs Microsoft Outlook® client messaging software sold by Microsoft Corporation. The client messaging software provides a graphical user interface (GUI) to display the user's messages held in their post office mailbox and to allow the user to invoke messaging functions. Since the mailboxes store messages in different formats, it is preferred that the personal computer 120 includes appropriate hardware and software to allow all message types to be retrieved. In cases where the personal computer 120 does not include the hardware and/or software necessary to support certain message types, appropriate message translators can be called to convert the messages into a form compatible with the personal computer 120.

Figure 3:
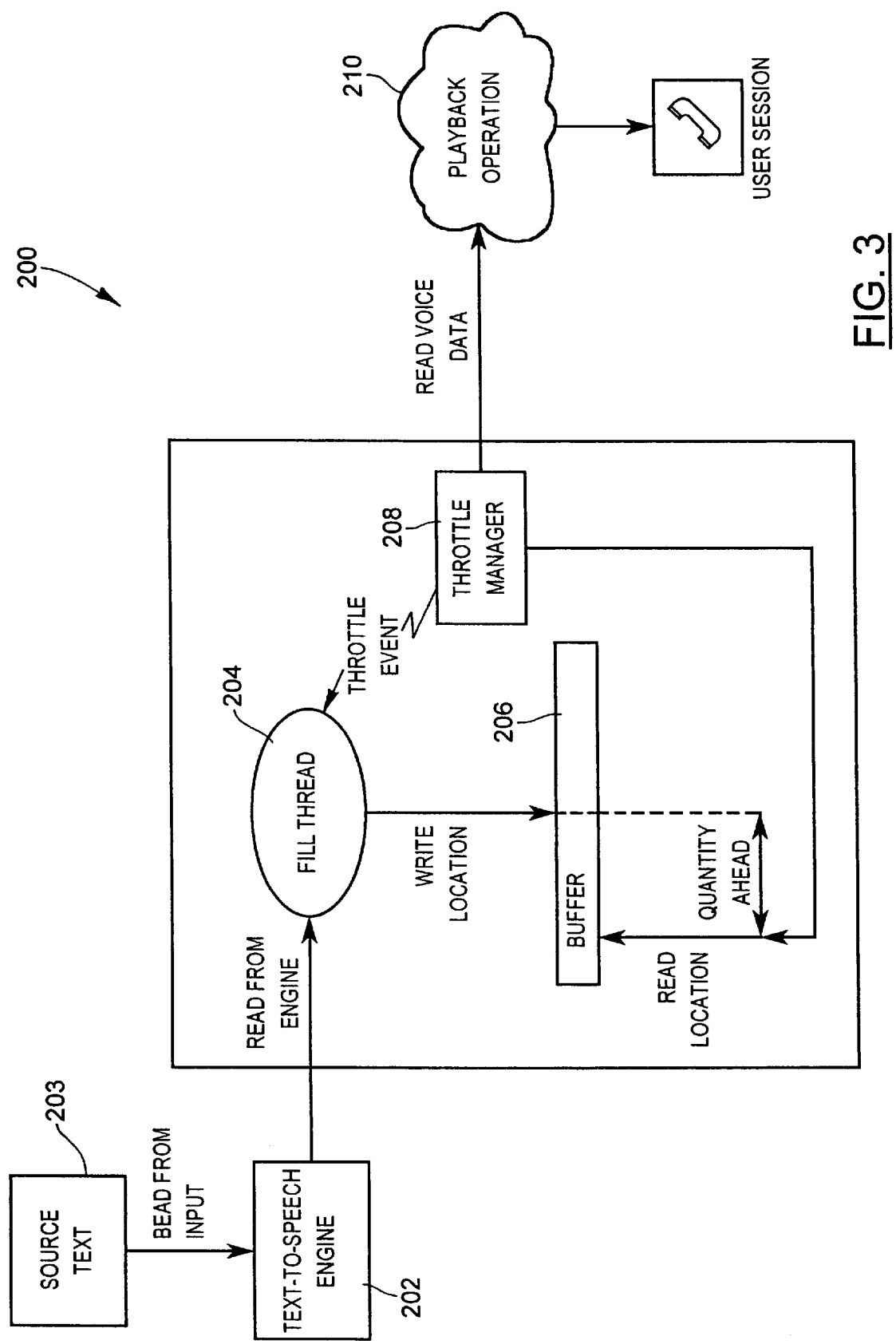
FIG. 3 is a schematic block diagram of a text-to-speech converter in accordance with the present invention used in the messaging system of FIG. 2.

Turning now to FIG. 3, the TTS 200 called by the voice messaging application to convert text messages to speech is shown. As can be seen, TTS 200 includes a text-to-speech engine 202 receiving a source text message 203 to be converted, from the post office 102. A fill thread 204 invoked by the CPU of the telephony messaging server 104 prompts the text-to-speech engine 202 to perform text-to-speech conversion and reads converted text from the text-to-speech engine 202. Converted text read from the text-to-speech engine 202 by the fill thread 204 is written to a buffer 206. A throttle manager 208 "tickles" the fill thread 204 and reads converted text from the buffer 206 in response to a playback event received from a playback operation 210. Converted text read from the buffer 206 by the throttle manager 208 is output to the playback operation 210 to allow the text message to be played back to a user as a voice message.

Figure 5:
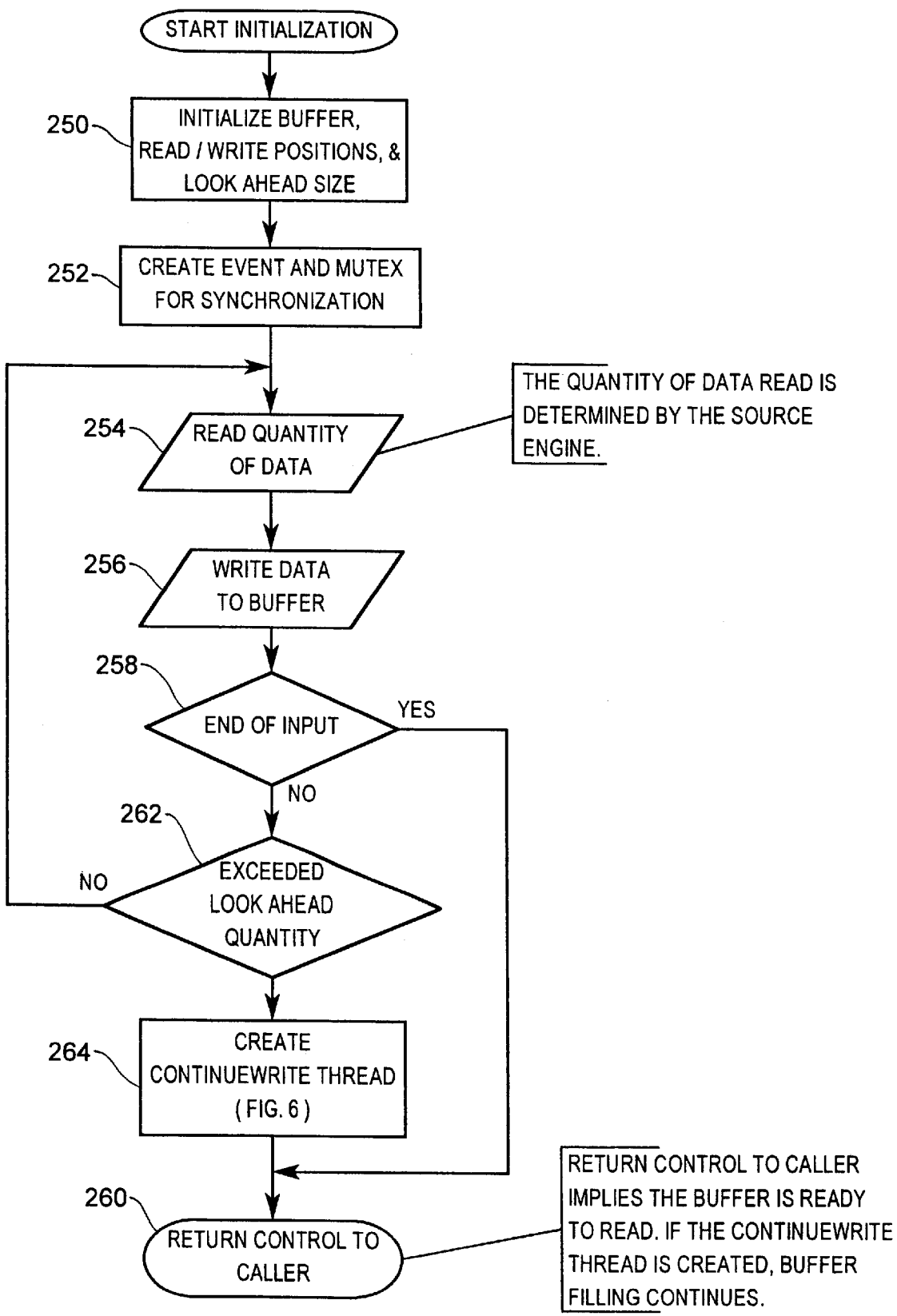
FIG. 5 is a flow chart showing the steps performed by the text-to-speech converter during buffer initialization.

The buffer 206 is designed with an interface which is the same as the stream output of the text-to-speech engine 202. As a result, the playback operation 210 reads data from the buffer 206 via the throttle manager 208 in the same manner as if it was reading data directly from the text-to-speech engine 202, making the buffer 206 transparent to the playback operation 210. The operation of the TTS 200 according to one embodiment of the present invention will now be described with particular reference to FIGS. 5 to 7.

When a user calls into the messaging system 100 to retrieve messages using a telephone or telephone device 114, the voice messaging application calls the speech file administrator, which in turn selects the appropriate voice message prompt instructing the user to enter their password via a touch-tone keypad. Upon entry of the proper password, the voice messaging application polls the post office 102 to determine the number and type of messages stored in the user's mailbox and presents this information to the user via a voice message prompt. The user is then able to retrieve and play selected messages by entering appropriate commands via the touch 30 tone keypad.

When the user selects a text message to be played back, the voice message application calls the TTS 200. When the TTS 200 is called, the TTS 200 initializes the buffer 206, sets the read and write positions for the buffer and sets the buffer look-ahead size (block 250). The look-ahead size determines the amount of data, which is kept in the buffer 206 beyond the current read position of the buffer 206. The TTS 200 then creates an event and mutual exclusion (mutex) for synchronization (block 252). As is well known, the event provided by the TTS operating system allows signaling between threads while the mutual exclusion ensures that threads sharing common resources, such as memory, access the common resources one at a time. At this stage, the CPU invokes a background fill thread, which in turn prompts the text-to-speech engine 202 to convert text. The background fill thread then reads converted text data from the text-to-speech engine 202 to pre-fill the buffer 206 with enough data to satisfy the buffer look-ahead requirements (block 254). The quantity of converted text data read from the text-to-speech engine 202, is determined by the text-to-speech engine 202. Once the quantity of converted text data has been read, the background fill thread writes the data to the buffer 206 and updates the buffer write position (block 256). The background fill thread then checks to see if the end of the converted text message has been reached (block 258). If so, the background fill thread stops reading data from the text-to-speech engine 202 and generates a return control to caller event signifying that the buffer 206 is ready to be read (block 260).

If the end of the converted text message has not been reached, the background fill thread checks to see if the buffer look-ahead requirements have been met (block 262). If not, the background fill thread reverts back to block 254 and reads more data from the text-to-speech engine 202. If the buffer look-ahead requirements have been met, the CPU invokes a background ContinueWrite thread (block 264) to handle the remaining buffer filling operation and then generates a return control to caller event (block 260). The background ContinueWrite thread replaces the background fill thread which is no longer used after the buffer 206 is pre-filled. The fill thread 204 illustrated in FIG. 3 is a representation of the background fill thread and/or the ContinueWrite thread.

Figure 6:
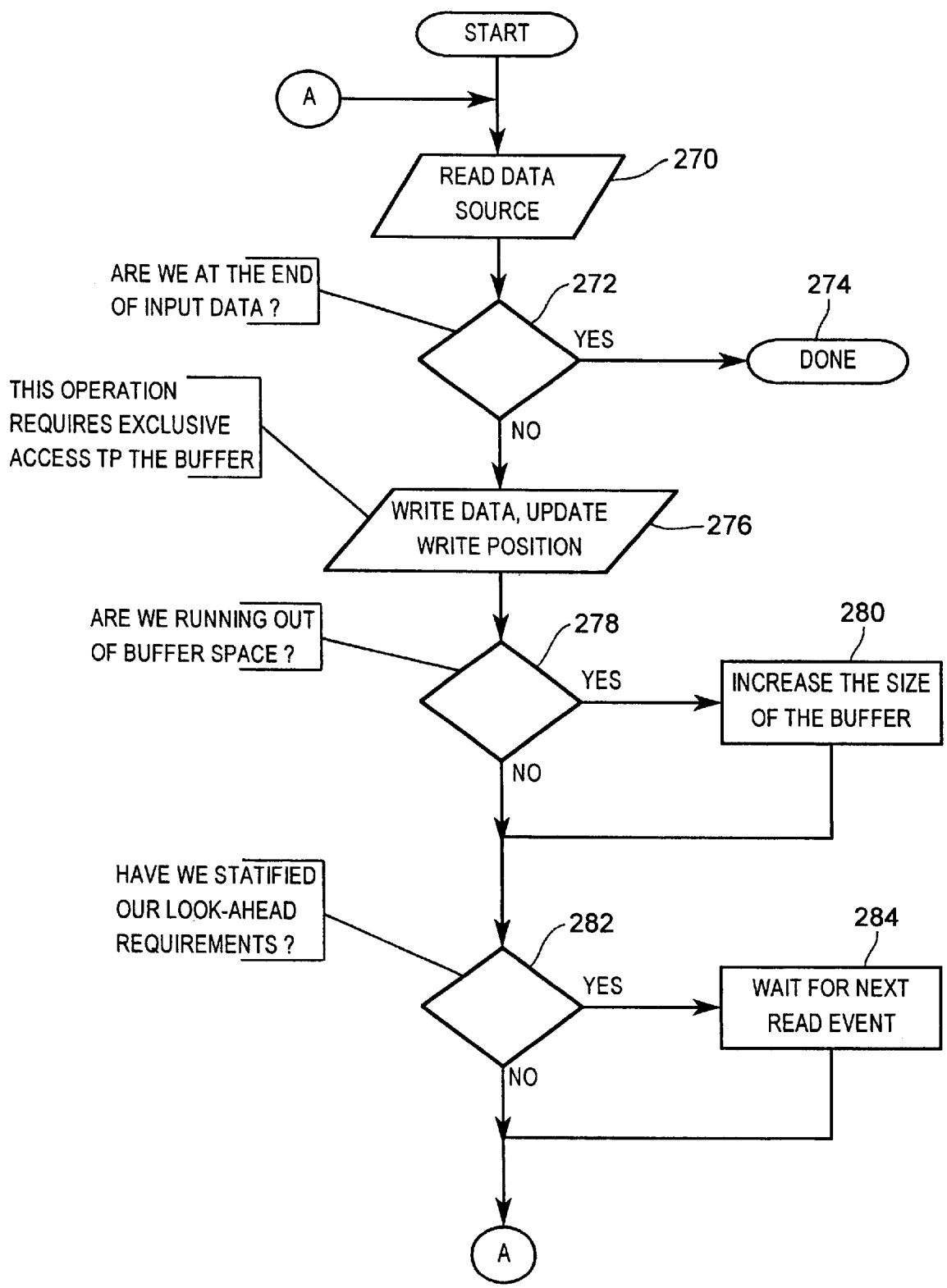
FIG. 6 is a flow chart showing the steps performed by the text-to-speech converter to fill the buffer with converted text.
Figure 7:
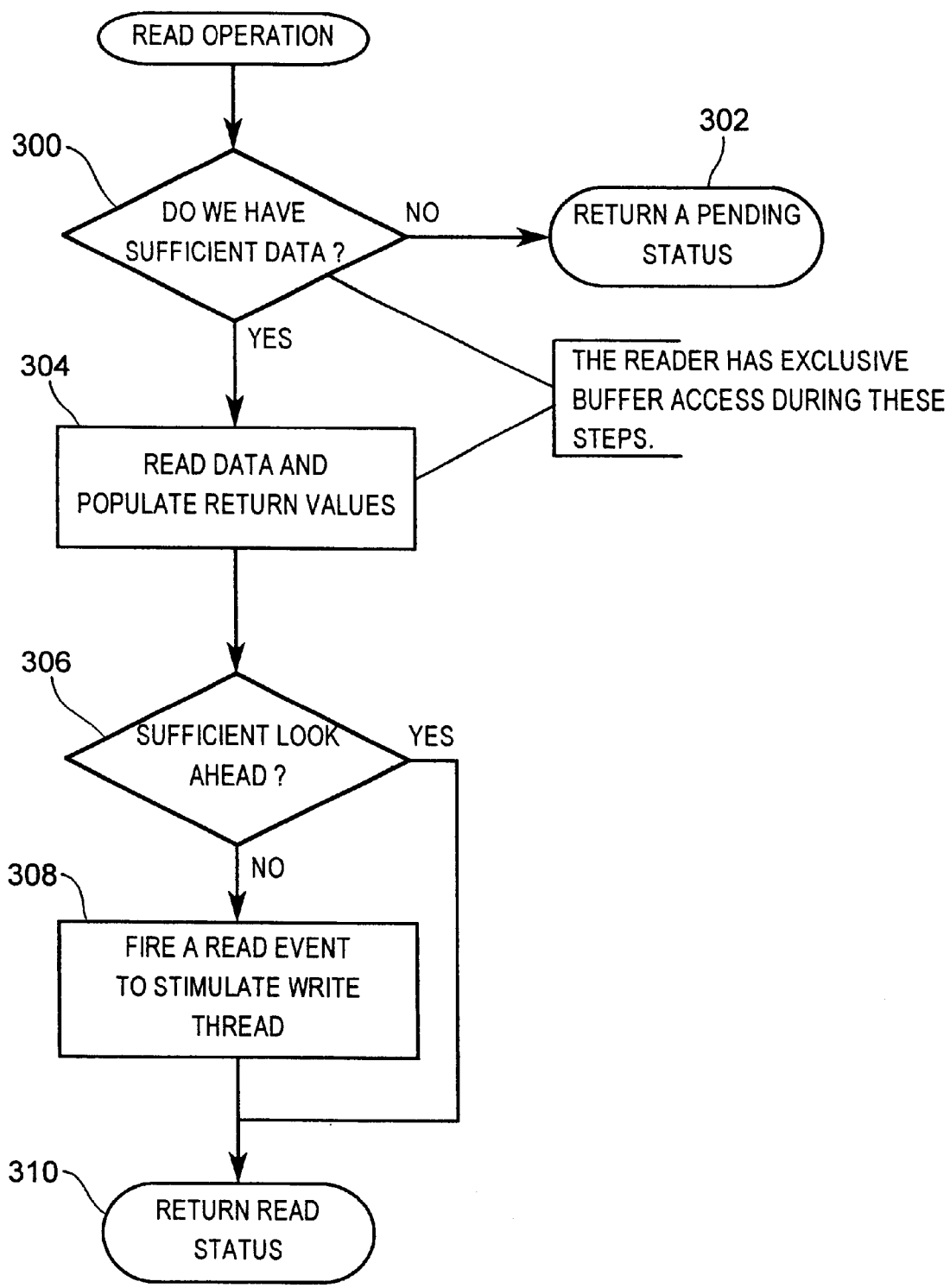
FIG. 7 is a flow chart showing the steps performed by the text-to-speech converter to read converted text from the buffer.

The ContinueWrite thread is further described below with reference to FIG. 6. Once the ContinueWrite thread is invoked, the ContinueWrite thread waits for receipt of a read event from the throttle manager 208. When a read event is received, the ContinueWrite thread prompts the text-to-speech engine 202 to convert text and reads another quantity of converted text data from the text-to-speech engine 202 (block 270). Following this, the ContinueWrite thread checks to see if the end of the converted text message has been reached (block 272). If so, a return control to caller event is generated (block 274) and the ContinueWrite thread is terminated.

If the end of the converted text message has not been reached, the ContinueWrite thread writes the data to the buffer 206 and updates the buffer write position (block 276). During this operation, the ContinueWrite thread has exclusive access to the buffer 206. Following this, the ContinueWrite thread checks the remaining capacity of the buffer (block 278). If remaining buffer space is insufficient, the ContinueWrite thread instructs the CPU to increase the buffer size (block 280). Following this, the ContinueWrite thread checks to see if the buffer look-ahead requirements have been met (block 282). If not, the ContinueWrite thread reverts back to block 270 and reads another quantity of data from the text-to-speech engine 202. If the buffer look-ahead requirements have been met, the ContinueWrite thread generates a return control to caller event and awaits receipt of the next read event (block 284) before reverting back to block 270.

When a return control to caller event is generated, the throttle manager 208 has access to the buffer 206 for reading. When data is to be read by the throttle manager 208 in response to a playback event generating by the playback operation 210, the throttle manager 208 examines the amount of data in the buffer 206 to determine if it is sufficient (block 300). If the amount of data is insufficient, the throttle manager 208 generates a return pending event to the playback operation to inform the user that there is additional data but it is not ready for playback (block 302). Once a sufficient amount of data is in the buffer 206, the throttle manager 208 reads the data from the buffer and populates the return values (block 304). In this embodiment, the return values are:

OK;

Pending;

End of Data; and

Error.

where "OK" signifies a successful read; "Pending" signifies that insufficient data was in the buffer to fulfill the read request at this time but that more data will be available; "End of Data" signifies that there is no more data; and "Error" signifies that an error in reading occurred. During this process, the throttle manager 208 has exclusive access to the buffer 206.

Following this, the throttle manager 208 checks to see if the buffer look-ahead requirements are still met (block 306). If not, the throttle manager 208 generates a read event causing the ContinueWrite thread to revert to block 270 and read more converted text data from the text-to-speech engine 202 (block 308). The throttle manager 208 then generates a return read event and awaits receipt of the next playback event (block 310). If the buffer look-ahead is still sufficient at block 306, the throttle manager 208 generates a return read event and awaits receipt of the next playback event (block 310).

During operation of the TTS 200, data written to the buffer 206 is kept in the buffer 206 for the entire duration of the playback operation 210. This allows a user to backup and replay the converted text message without incurring any additional overhead.

Figure 1:
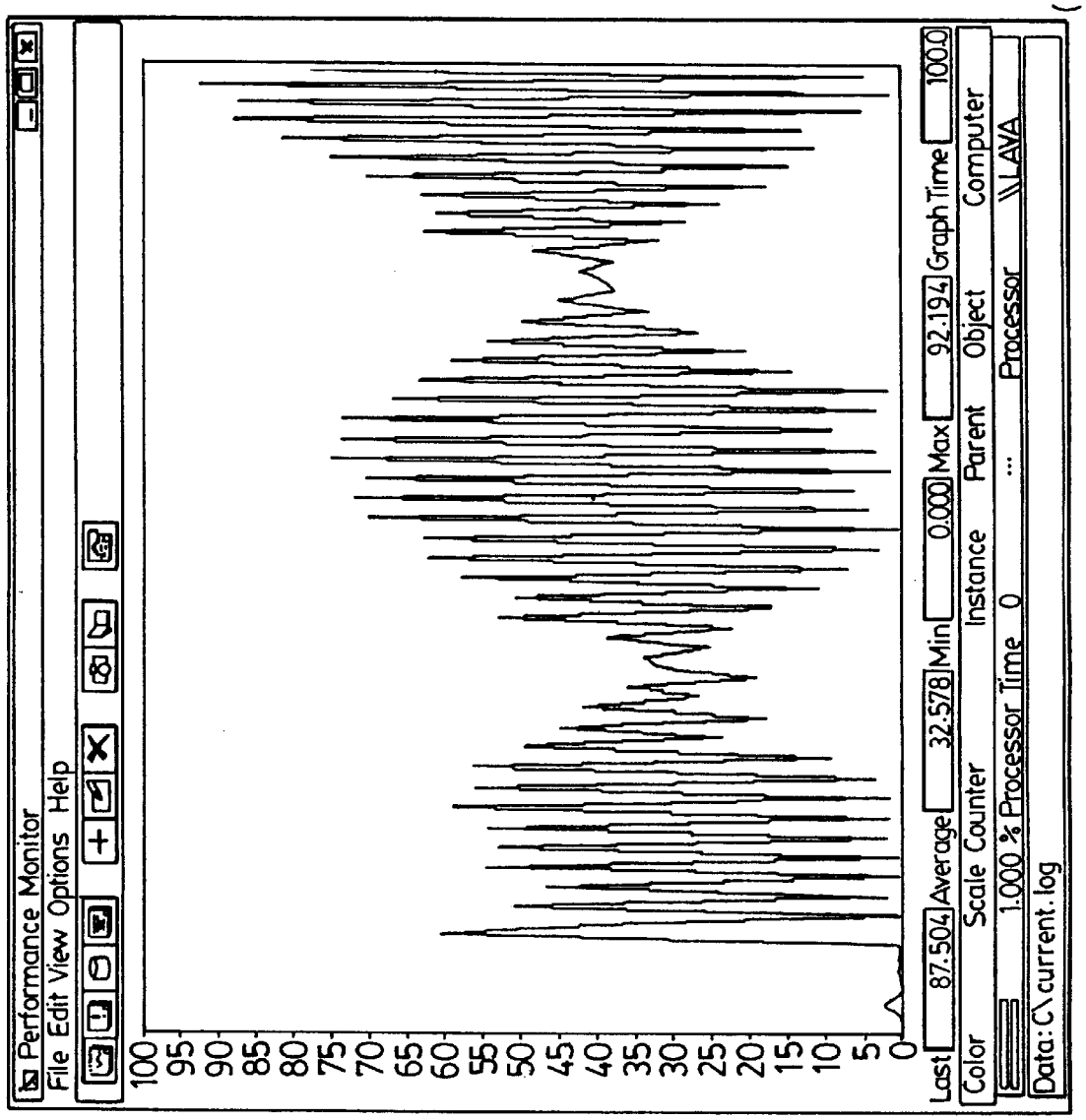
FIG. 1 is a graph showing CPU usage in a prior art CPU based text-to-speech converter.
Figure 8:
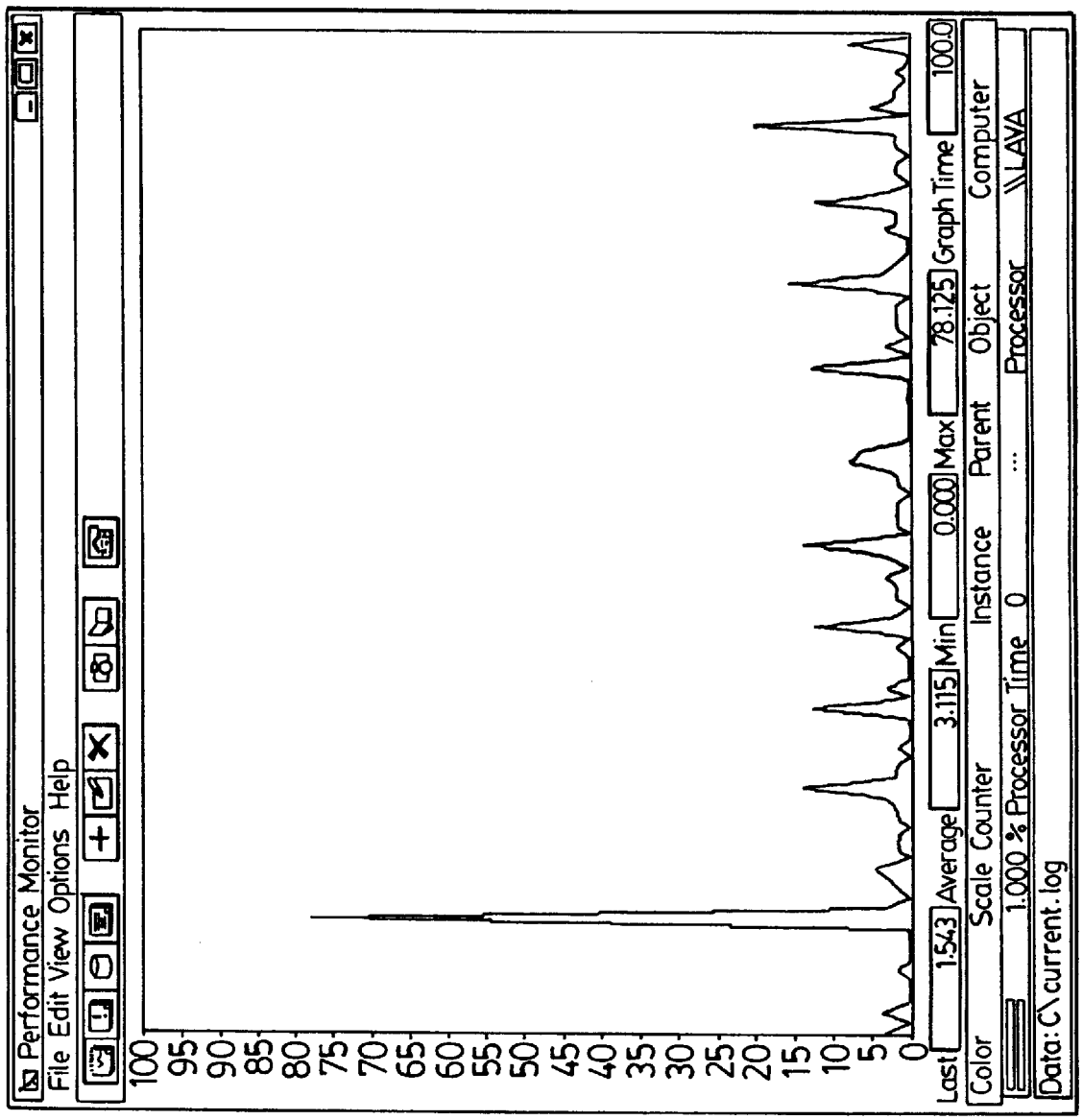
FIG. 8 is a graph showing CPU usage in the text-to-speech converter of FIG. 3.

Since the ContinueWrite thread waits for a tickle in the form of a read event generated by the throttle manager 208 before signaling the text-to-speech engine 202 to convert text for reading, CPU usage for background text-to-speech conversion is reduced. Also, this throttling mechanism helps to manage efficiently the buffer usage. For example, turning to FIGS. 1 and 8, graphs showing CPU usage in cycles per second during text-to-speech conversion and playback for a prior art TTS and the present TTS 200 are shown. As can be seen in FIG. 1, in the prior art TTS, lack of throttling places heavy loading on the CPU. In contrast, in the present TTS 200, after the CPU has performed the buffer initialization and buffer pre-fill of converted text data, CPU usage is minimal. Periodic small jumps in CPU usage occur when the ContinueWrite thread fetches converted text data from the text-to-speech engine 202.

Figure 4A:
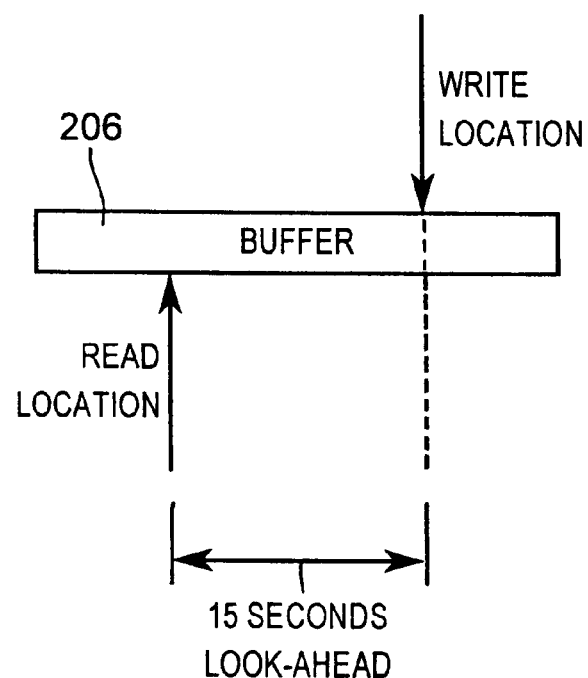
FIGS. 4a and 4b are schematic block diagrams of different look-ahead configurations for a buffer forming part of the text-to-speech converter of FIG. 3.
Figure 4B:
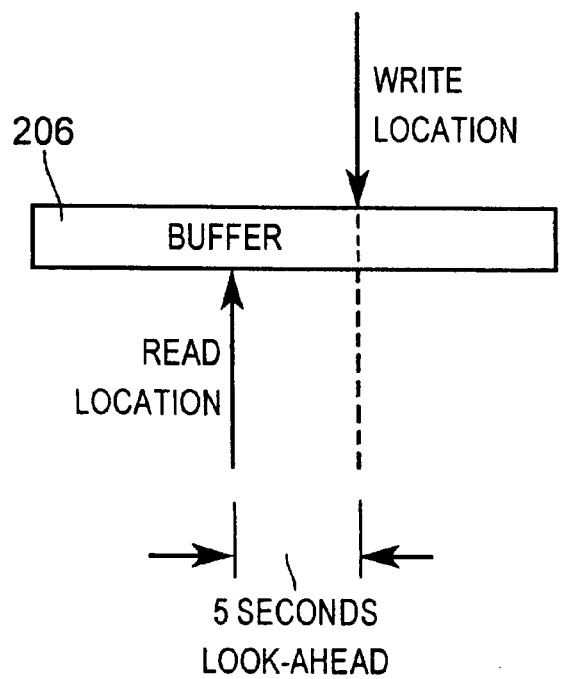

The look-ahead size of the buffer is chosen to suit the needs of the particular system in which the TTS is implemented. For example, in a multiple CPU messaging system, the data written to the buffer may only need to stay a few seconds ahead of user playback. However, in slower messaging systems, the data written to the buffer may need to stay ahead of user playback by a larger amount. FIGS. 4*a* and 4*b* show examples of buffer look-ahead sizes for slower and faster messaging systems respectively. Ideally, the buffer look-ahead size is chosen to optimize the TTS so that the TTS provides enough look-ahead to guarantee data availability but no more. Thus, if a user elects to delete a message before it is played back in its entirety, basically only the portion of the message that the user listened to is converted prior to the message being deleted. As a result, CPU usage for text-to-speech conversion and memory usage is reduced.

If desired, the TTS 200 can be programmed to allow rules to be defined. In this manner, rules governing variations in throttling based on user level, time of day, system load etc. can be established. Alternatively, the TTS can use adaptive technology to monitor user TTS usage patterns over time and use users' prior message reading histories to control throttling.

Figure 9:
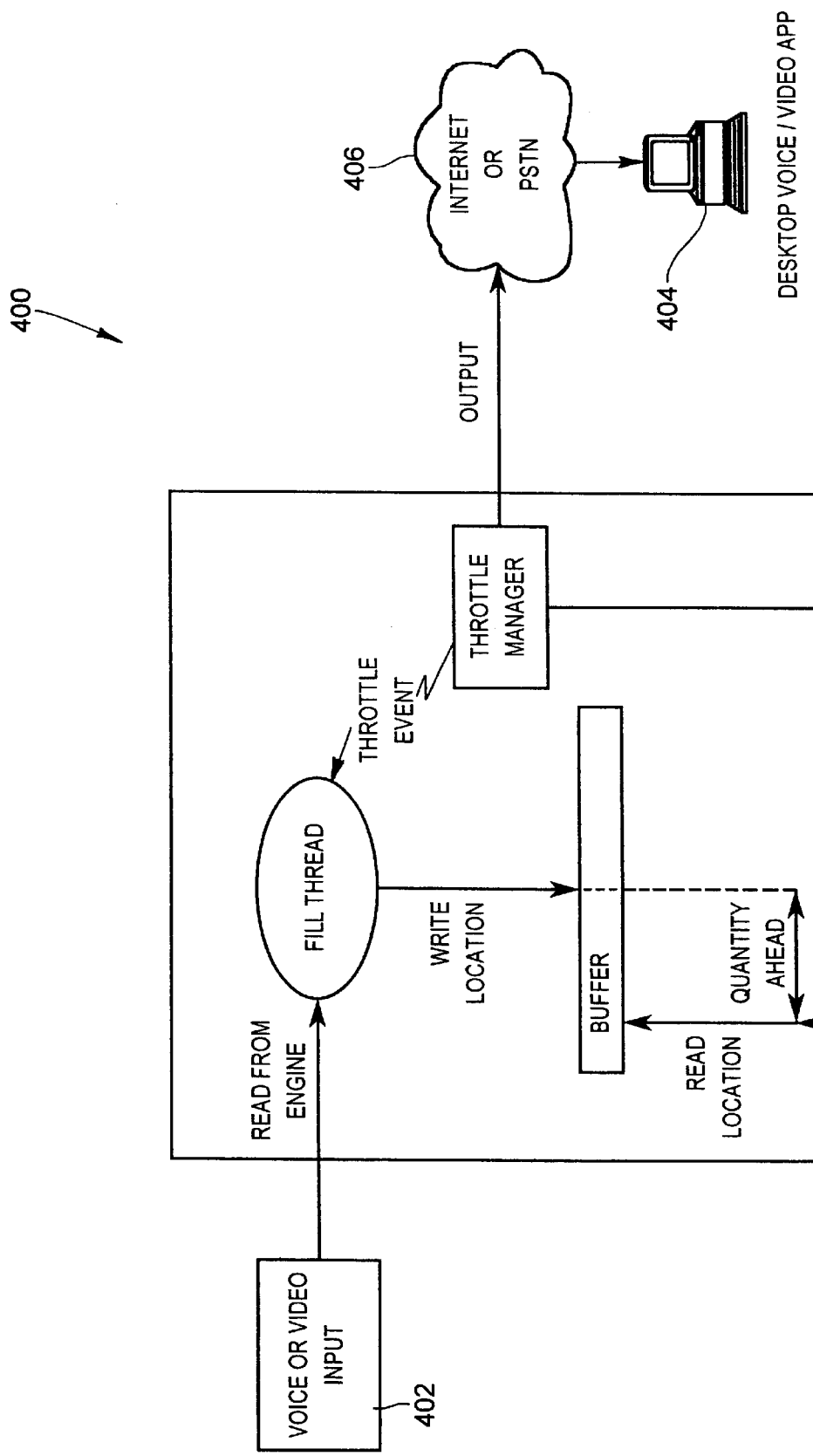
FIG. 9 is a schematic block diagram of a system to buffer voice and/or audio data transmitted over limited bandwidth networks in accordance with another aspect of the present invention.

Turning now to FIG. 9, a system 400 for throttling data from an audio or video source 402 to a personal computer 404 equipped with a desktop voice/video application over a network 406 is shown. In this example, the network 406 is a limited bandwidth network such as the Internet or a public switched telephone network (PSTN). The system 400 in this embodiment works the same as that of the previous embodiment to throttle data so that it becomes available to the personal computer 404 on basically an as needed basis.

Although preferred embodiments of the present invention have been described, those skilled in the art will appreciate that variations and modifications may be made without departing from the spirit and scope thereof as defined by the appended claims.

We claim:

1. A text-to-speech converter comprising:
   a text-to-speech engine receiving source text and converting said source text into speech data;
   a read mechanism reading speech data from said text-to-speech engine and writing said speech data to a buffer; and
   a throttle mechanism reading speech data from said buffer and conveying said speech data to a playback operation, said throttle mechanism triggering said read mechanism to read data from said text-to-speech engine and write said speech data to said buffer so that unread speech data in said buffer remains ahead of speech data read by said throttle mechanism by at least a threshold amount, said buffer being unavailable to said throttle mechanism during writing of speech data to said buffer.

2. A text-to-speech converter as defined in claim 1 wherein said threshold amount is programmable.

3. A text-to-speech converter as defined in claim 2 wherein said read mechanism pre-fills said buffer during initialization to include a threshold amount of unread speech data before said throttle mechanism is permitted to read speech data from said buffer.

4. A text-to-speech converter as defined in claim 3 wherein after said throttle mechanism reads speech data from said buffer, said throttle mechanism examines said buffer to determine if unread speech data remaining in said buffer is at least equal to said threshold amount, said throttle mechanism triggering said read mechanism if unread speech data in said buffer is less than said threshold amount.

5. A text-to-speech converter as defined in claim 4 wherein during reading of data from said buffer by said throttle mechanism, said buffer is unavailable to said read mechanism for writing of speech data to said buffer.

6. A text-to-speech converter as defined in claim 5 wherein said read mechanism comprises a fill thread invoked by a central processing unit, said fill thread being responsive to read events generated by said throttle mechanism when unread speech data in said buffer falls below said threshold amount.

7. A text-to-speech converter as defined in claim 2 wherein said buffer retains said speech data until the text-to-speech conversion process is terminated.

8. A text-to-speech converter as defined in claim 2 wherein during reading of data from said buffer by said throttle mechanism, said buffer is unavailable to said read mechanism for writing of speech data to said buffer.

9. A text-to-speech converter as defined in claim 8 wherein said read mechanism comprises a fill thread invoked by a central processing unit, said fill thread being responsive to read events generated by said throttle mechanism when unread speech data in said buffer falls below said threshold amount.

10. A text-to-speech converter comprising:
    a text-to-speech engine receiving source text and converting said source text into speech data;
    a read mechanism reading speech data from said text-to-speech engine and writing said speech data to a buffer; and
    a throttle mechanism reading speech data from said buffer and conveying said speech data to a playback operation, said throttle mechanism triggering said read mechanism to read said speech data from said text-to-speech engine and write said speech data to said buffer so that to the extent available at least a threshold amount of unread speech data remains in said buffer, said buffer being unavailable to said read mechanism during reading of speech data from said buffer.

11. A text-to-speech converter as defined in claim 10 wherein said threshold amount is programmable.

12. A text-to-speech converter as defined in claim 11 wherein said read mechanism pre-fills said buffer during initialization to include a threshold amount of unread speech data that is substantially less than all of the speech data before said throttle mechanism is permitted to read speech data from said buffer.

13. A text-to-speech converter as defined in claim 12 wherein said buffer is unavailable to said throttle mechanism during writing of speech data to said buffer.

14. A text-to-speech converter as defined in claim 11 wherein after said throttle mechanism reads speech data from said buffer, said throttle mechanism examines said buffer to determine if unread speech data remaining in said buffer is at least equal to said threshold amount, said throttle mechanism triggering said read mechanism if unread speech data in said buffer is less than said threshold amount.

15. A text-to-speech converter as defined in claim 11 wherein said throttle mechanism operates to trigger said read mechanism as needed so that to the extent available approximately the threshold amount of the unread speech data remains in said buffer.

16. A text-to-speech converter as defined in claim 15 wherein said buffer is unavailable to said throttle mechanism during writing of speech data to said buffer.

17. A text-to-speech converter comprising:

an engine receiving text and converting said text into speech data;

a read mechanism reading speech data from said engine and writing the speech data to a buffer; and a throttle reading speech data from said buffer and conveying the speech data to a playback operation, wherein said buffer is unavailable to said throttle during writing of speech data to said buffer and wherein said buffer is unavailable to said read mechanism during reading of speech data from said buffer.

18. A text-to-speech converter according to claim 17 wherein said buffer maintains a threshold amount of speech data therein.

19. A text-to-speech converter according to claim 18 wherein said read mechanism is responsive to said throttle to maintain the speech data in said buffer at least at said threshold amount.

20. A text-to-speech converter according to claim 19 wherein said threshold amount is programmable.

21. A text-to-speech converter comprising:

an engine receiving text and converting said text into speech data;

a read mechanism reading speech data from said engine and writing the speech data to a buffer; and a throttle reading speech data from said buffer and conveying the speech data to a playback operation, wherein said read mechanism and throttle are inhibited from accessing said buffer simultaneously.

22. A text-to-speech converter according to claim 21 wherein said buffer maintains a threshold amount of speech data therein.

23. A text-to-speech converter according to claim 22 wherein said read mechanism is responsive to said throttle to maintain the speech data in said buffer at least at said threshold amount.

24. A text-to-speech converter according to claim 23 wherein said threshold amount is programmable.

\* \* \* \* \*